United States Patent [19]
Chen

[11] Patent Number: 5,121,098
[45] Date of Patent: Jun. 9, 1992

[54] MULTI-FUNCTION CAR DOOR CLOSURE WARNING SYSTEM

[76] Inventor: Liang-Tsai Chen, No. 1, Alley 40, Lane 161, Ku Shan First St., Ku Shan Kaoshiuna, Taiwan

[21] Appl. No.: 692,920

[22] Filed: Apr. 29, 1991

[51] Int. Cl.$^5$ .............................................. B60Q 1/00
[52] U.S. Cl. .................... 340/457; 340/547; 340/321; 340/693; 340/473; 307/10.1
[58] Field of Search ........ 340/457, 321, 693, 545–547, 340/471–474; 307/9.1, 10.1, 10.8

[56] References Cited

U.S. PATENT DOCUMENTS

| | | | |
|---|---|---|---|
| 3,697,943 | 10/1972 | Andres | 340/457 |
| 4,427,975 | 1/1984 | Kinzie | 340/547 |
| 4,843,374 | 6/1989 | Sansky | 340/547 |
| 4,879,543 | 11/1989 | Smith, Sr. | 340/473 |
| 5,038,135 | 8/1991 | Jurkiewicz et al. | 340/457 |

*Primary Examiner*—Donnie L. Crosland

[57] ABSTRACT

A multi-function car door closure warning sensor includes a main module secured to a car door adjacent to an edge thereof, and an auxiliary module secured to the car body and adjacent with the main module, when the car door is in a closed position. A battery, a first soft magnetic pole piece with an attached normally closed magnetic switch, a buzzer, two sets of L.E.D.'s, and an L.E.D. control circuit are disposed within the main module. A permanent magnet with an atached second soft magnetic pole piece are disposed within the auxiliary module. Whereby, when the door is properly closed, the first and second soft magnetic pole pieces are aligned and separated by a small gap. The permanent magnet induces a magnetic field in the first pole piece which causes the magnetic switch to open. When the car door is not properly closed, no magnetic field is induced in the first pole piece causing the magnetic switch to close, activating the buzzer and L.E.D. control circuit, which causes the two sets of L.E.D.'s to flash on and off intermittently in see-saw fashion.

6 Claims, 4 Drawing Sheets

MULTI-FUNCTION CAR DOOR CLOSURE WARNING SYSTEM

BACKGROUND OF THE PRESENT INVENTION

The present invention relates to a car door closure warning system and more particularly to a multi-function car door closure warning system that provides impact protection to a car door and can act as an emergency warning light.

Though car door closure warning systems have been provided in the past, most were integrally mounted with the motor vehicle or were limited to that particular function.

The car door closure warning system of the present invention is an independant unit that provides a number of functions. Moreover, it can be manufactured from inexpensive components and mounted on the exterior of a car body without the need of any extraneous tools.

The car door closure warning system of the present invention comprises an auxiliary module and a main module mounted adjacently on the edge of a car door and an adjacent body panel, respectively.

If the car door is improperly closed and ajar with the adjacent body panel, audible and visible warning signals are issued by the main module.

An improperly closed car door would, of course, pose a safety hazard to the passengers, possibly coming open while the motor vehicle is moving, and makes the vehicle vulnerable to theft.

As the auxiliary module protrudes from the side off the car door, it also serves to protect the edge of the car door against impact, of the type that commonly occurs when a passenger is opening the door from the interior of the vehicle and strikes an external object, such as a wall or pole, etc.

Both the modules are mounted to the car body by adhesive pads, requiring no hand tools. As such, the main module can be manually removed and re-mounted on another portion of the car body, where it will automatically issue visible and audible warnings acting as an emergency warning system.

Also as a result of the mounting method, if perchance a glancing collision occurs between the two modules and a foreign object, as could occur when driving through a narrow passage, the two modules would simply shear off without incurring damage to the vehicle. The collision would also warn the driver to take action before contact with the car body occurs.

SUMMARY OF THE PRESENT INVENTION

The main objective of the multi-function car door closure warning system of the present invention is to provide a car door closure warning system that delivers both audible and visible warning signals of an improperly closed car door, with a second objective of providing an impact guard for the car door to which it is mounted, and a third objective of providing an emergency warning light that is readily available to a user.

The car door closure warning system of the present invention comprises a main module secured to an exterior panel of a car body adjacent to a door thereon, and an auxiliary module secured to the edge of the door and adjacent with the main module, when the door is in a closed position.

A buzzer and two sets of L.E.D.'s, or light emitting diodes, are disposed within the main module, controlled by an L.E.D. controller, along with a number of batteries. The buzzer and L.E.D. controller are connected to the batteries through a magnetically activated switch.

The magnetically activated switch is disposed on a soft magnetic pole piece which protrudes from the side of the main module. A similar soft magnetic pole piece protrudes from the side of the auxiliary module, with a permanent nagnet secured thereon and disposed in the interior of the auxiliary module.

When the car door is properly closed, the soft magnetic pole piece within the auxiliary unit is aligned with the soft magnetic pole piece of the main unit and separated therefrom by a small gap.

The permanent magnet within the auxiliary unit induces a magnetic field in the soft magnetic pole piece of the main unit and activates the magnetic switch which is normally closed.

With the magnetically activated switch in an open state, the buzzer and L.E.D.'s remain inoperative.

However, when the car door is improperly closed, causing a disalignment of the two soft magnetic pole pieces, the magnetic switch returns to its inactive closed state.

The buzzer and L.E.D. controller are thus activated. The buzzer emits a warning tone and the L.E.D. controller causes the two sets of L.E.D.'s to flash on and off intermittently, in a see-saw, fashion with one set of L.E.D.'s emitting light when the other is inactive.

The main objective of the present invention is thereby achieved. As the auxiliary unit protrudes from the side of the car door and has an outer shell, made from tough, shock absorbing plastic. considerable protection is provided to the edge of the car door, guarding it against impact damage.

Moreover, as both the auxiliary unit and main unit are secured to the car body with an adhesive layer, when the car is driven through a narrow passage or in close proximity to another motor vehicle or other object, the two units would be sheared away by the occurence of a glancing impact. The impact would also create an audible sound, alerting the driver to brake or steer away before the impacting object contacts the actual car body. As the two units are attached only adhesively, no damage to the car body would be incurred by their violent dislodging.

The secondary objective of the present invention is thereby also achieved.

The main unit could also be manually removed and re-mounted on any portion of the exterior of the car body. With the auxiliary module being separated from the main module, the main module would automatically and continuously sound the buzzer and flash the L.E.D.'s, acting as an emergency warning light and siren at night, achieving the fourth objective of the present invention.

A BRIEF DESCRIPTION OF THE DRAWINGS

PREFERRED EMBODIMENT OF THE PRESENT INVENTION

Figure 2:
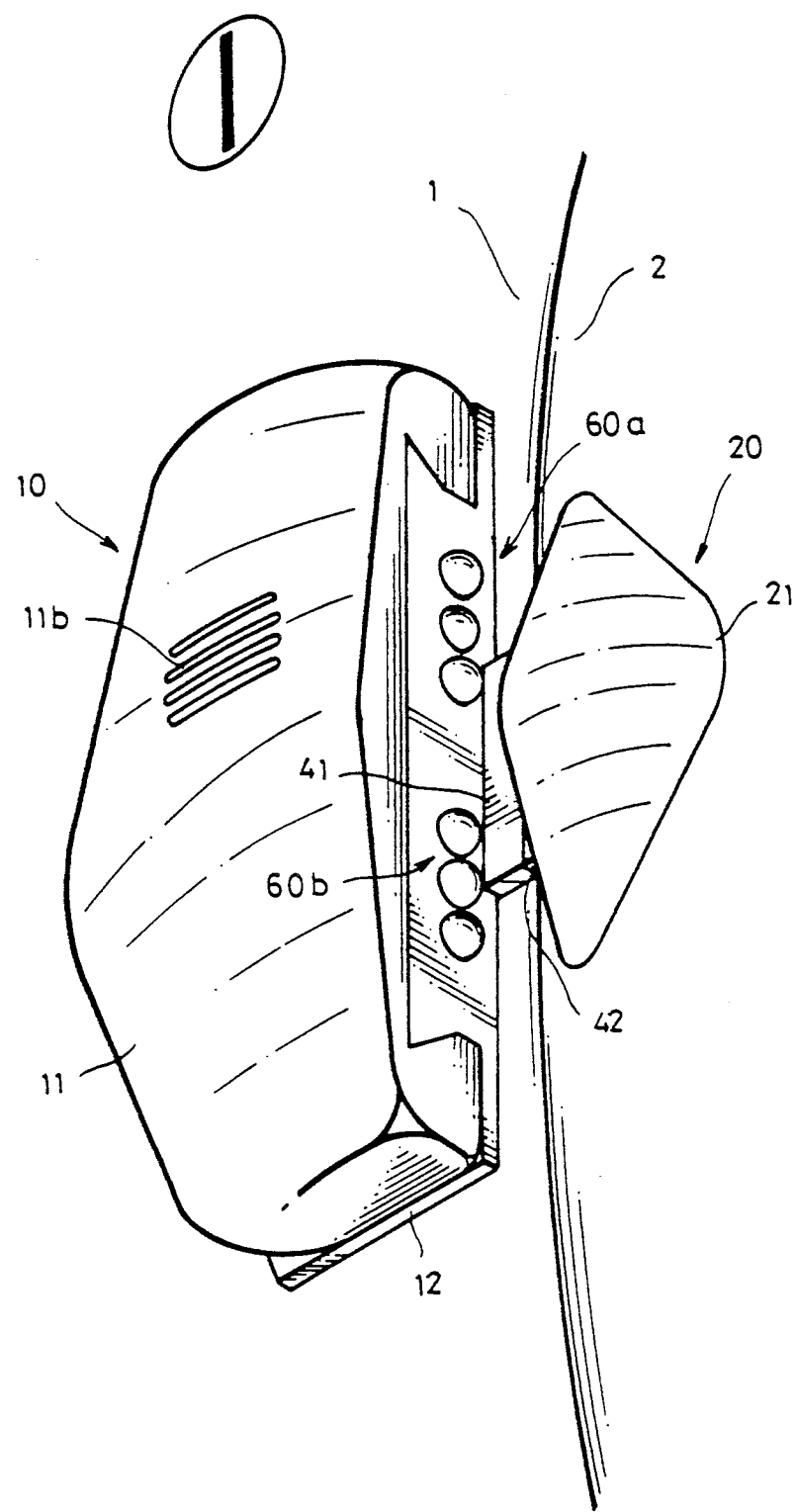
FIG. 2 is a perspective view of the multi-function car door closure warning system of the present invention mounted to a car body.
Figure 3:
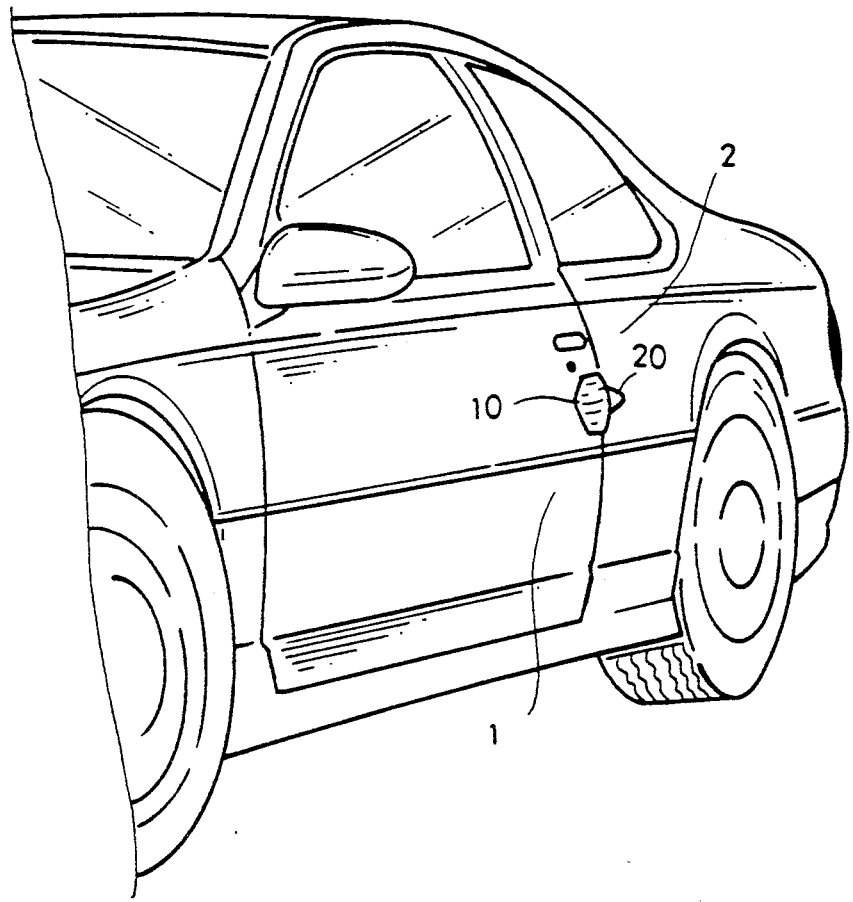
FIG. 3 is a close-up view of a mounted multi-function car door closure warning system of the present invention mounted to a car body.

Referring to FIGS. 2 and 3, the car door closure warning system of the present invention comprises a main module 10 mounted on the exterior of a car door 1 adjacent to an edge thereof, and an auxiliary module 20 mounted on a car body 2 adjacent with main module 10, when car door 1 is properly closed.

A first soft magnetic pole piece 41 is disposed within main module 10, protruding from a side thereof. Likewise, a second soft magnetic pole piece 42 is disposed within auxiliary module 20, protruding from a side thereof and being aligned with second soft magnetic pole piece 41, when car door 2 is properly closed.

Figure 1:
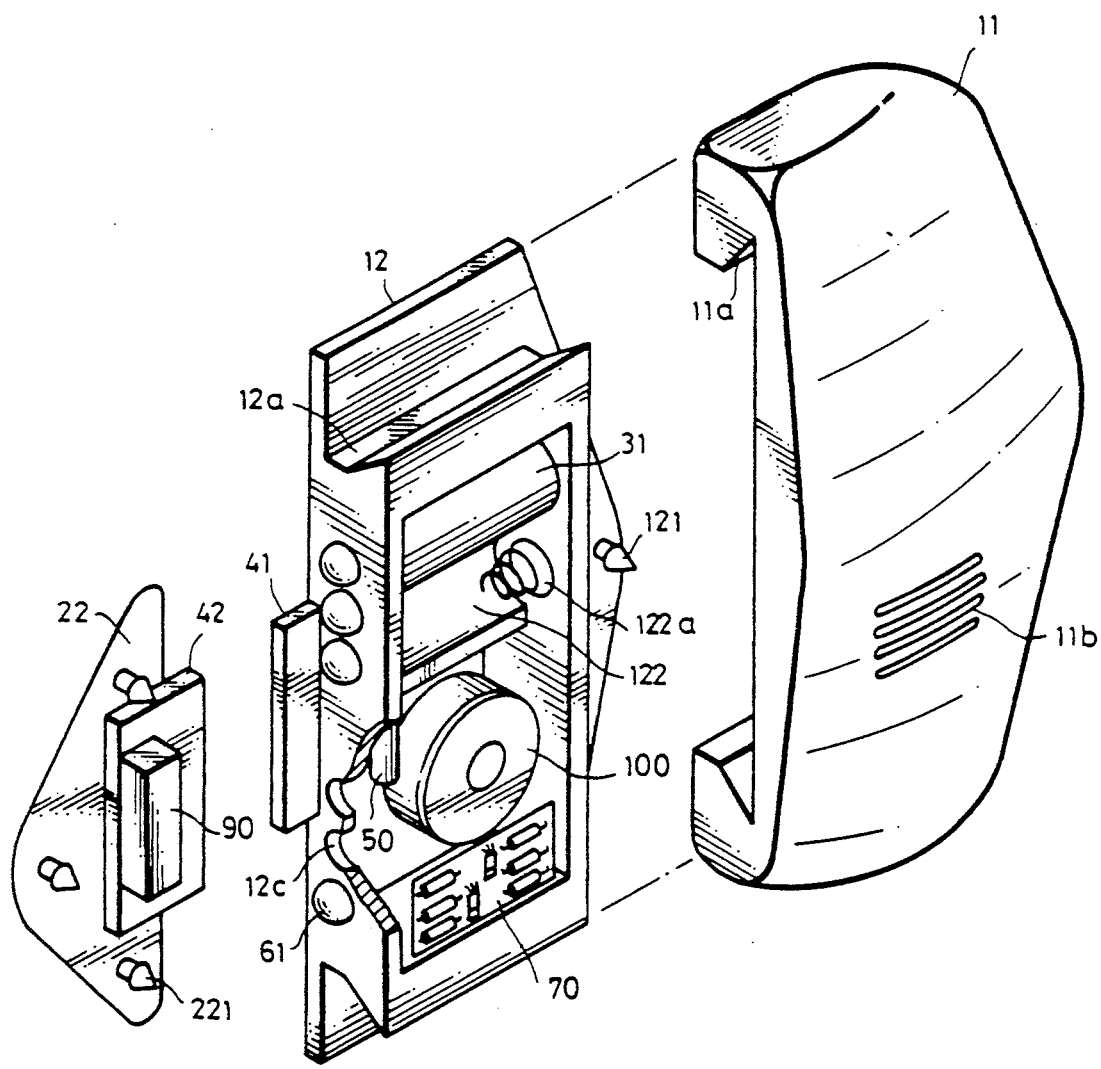
FIG. 1 is a perspective view of a disassembled main module and auxiliary module of the multi-function car door closure warning system of the present invention.

Referring to FIG. 1, main module 10 has a sliding cover 11, made from foamed polyurethane, that has a pair of dovetail grooves 11a formed on the inner sides thereof. An internal box 12 of main module 10 has a matching pair of dovetail guides 12a formed on the sides thereof.

Sliding cover 11 is assembled with internal box 12 by inserting cover 11 over internal box 12 with the pair of dovetail grooves 11a riding in respective dovetail guides 12a. A rounded securing pin 121 is then snap fitted into a catch disposed to the rear of sliding cover 11 (not shown), to releasably secure cover 11 with box 12.

Similarly, auxiliary module 20 has an external cover 21, shown in FIG. 2, made from foamed polyurethane, that is secured to a base plate 22 by three securing pins 221, that snap fit into corresponding catches formed on the bottom of cover 21.

A permanent magnet 90 is attached to second soft magnetic pole piece 42, disposed within auxiliary module 20, and a magnetically activated, normally closed, switch 50 is attached to first soft magnetic pole piece 41, disposed within box 12.

Dry cells 31 are disposed in battery wells 122, formed on the lower surface of internal box 12. Each battery well 122 having a contact spring 122a disposed to the rear thereof and a corresponding contact tab to the front.

A buzzer 100 and a printed circuit board 70 are also disposed within box 12. Slots 11b are formed on the outer side of cover 11 to facilitate the acoustic transmission of buzzer 100.

Two sets of three light emitting diodes 61, 60a and 60b, are disposed within box 12, with each light emitting diode 61 being positioned behind an aperture 12c, formed on the front wall of box 12.

Figure 4:
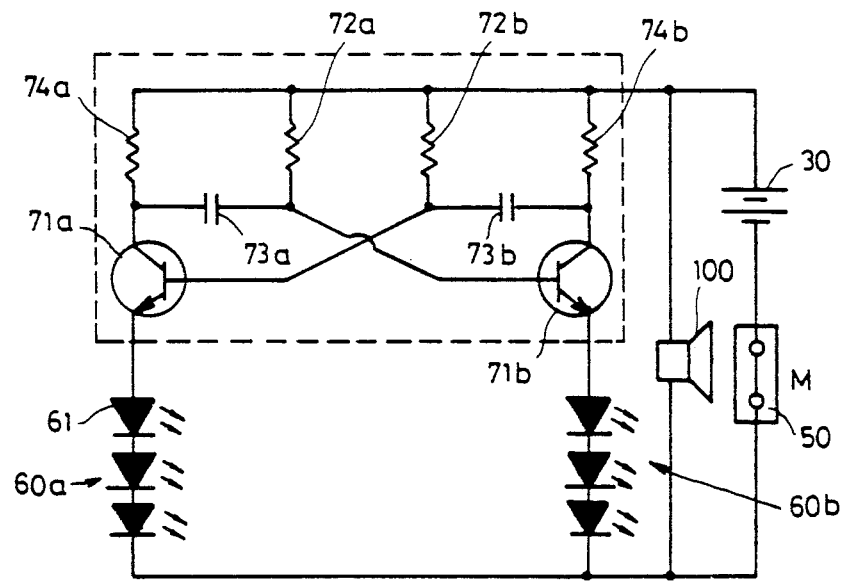
FIG. 4 is an electrical circuit diagram of an L.E.D. controller of the multi-function car door closure warning system of the present invention.

Dry cells 31, magnetic switch 50, buzzer 100, light emitting diodes 61, and the electronic components of printed circuit board 70 are electrically connected according to the circuit diagram of FIG. 4.

The components within the area denoted by the dashed line box are mounted on printed circuit board 70.

Magnetic switch 50 is normally closed, and opened only when activated by the presence of a magnetic field. Hence, when car door 2 is properly closed, second pole piece 42 is aligned with first pole piece 41, and permanent magnet 90 induces a magnetic field in the latter, which activates magnetic switch 50 to an open state. As such, there is no activity in buzzer 100 or light emitting diodes 61.

When car door 2 is improperly closed, i.e. set ajar, the resultant disalignment of first and second soft magnetic pole pieces, 41 and 42, causes the magnetic field in first soft magnetic pole piece 41 to cease, and magnetic switch 50 to return to a closed state.

Buzzer 100 and light emitting diodes 61, controlled by the circuit in circuit board 70, are then activated, with buzzer 100 emitting a warning tone.

The light emitting diode controller circuit of printed circuit board 70 controls the two sets of light emitting diodes, 60a and 60b, and comprises a pair of switching transistors 71a and 71b, a pair of resistors 72a and 72b, a pair of capacitors 73a and 73b, and a pair of resistors 74a and 74b.

The first and second set of light emitting diodes 60a and 60b are connected in series between the emitters of respective switching transistors, 71a and 71b, and a second terminal of battery 30. Current limiting resistors, 74a and 74b, are connected in series between the collectors of respective transistors, 71a and 71b, and the first terminal of battery 30. The respective bases of transistors, 71a and 71b, are connected in parallel to a first terminal of resistors 72a and capacitor 73a, and a first terminal of resistor 72b and capacitor 73b, respectively. The second terminal of capacitors, 73a and 73b, are connected respectively with the collectors of transistors, 71a and 71b. The second terminal of resistors, 72a and 72b, are connected in parallel with the first terminal of battery 30.

Resistor 72a and capacitor 73a, and resistor 72b and capacitor 73b, have equal time constants.

As would be apparent to one skilled in the art, upon the closure of magnetic switch 50, the first and second sets of light emitting diodes, 61a and 61b, would flash on and off, intermittently, in see-saw fashion, with one set emitting light while the other is inactive, with the active duration of both sets being equal.

Figure 5:
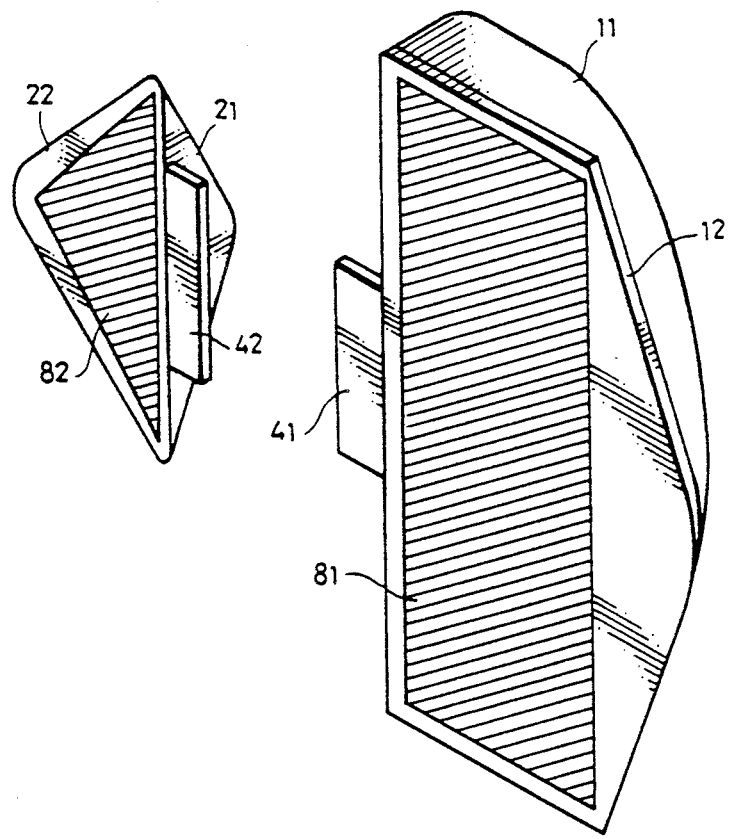
FIG. 5 is a perspective rear view of the main module and auxiliary module of the multi-function car door closure warning system of the present invention.

Referring to FIG. 5, main module 10 and auxiliary module 20 are mounted to car door 1 and car body 2, respectively, by adhesive pads 81 and 82, attached respectively to the bottoms of box 12 and base 22.

Main module 10 may be manually removed and remounted on another portion of car body 2, such as the roof and act as an emergency light and siren at night. Being separated from auxiliary module 20, buzzer 100 and light emitting diodes 61, as controlled by printed circuit board 70, would, of course, automatically and continuously be active.

Furthermore, if perchance a glancing collision were to dislodge main module 10 and auxiliary module 20, no damage would be incurred by car body 2, as would be the case with a car door closure warning system that was mounted mechanically.

As an alternative embodiment of the present invention, permanent magnets can be used in place of adhesive pads 81 and 82. Likewise, other embodiments may use a different controller circuit providing alternate flashing patterns, or light sources other light emitting diodes may be implemented.

As such, the above description should serve only as a guideline with the actual scope of the present invention being defined by the claims below.

I claim:

1. A car door closure warning system comprising a main module mounted on the exterior of a car door adjacent to an edge thereof, and an auxiliary module mounted on a car body adjacent with said main module, wherein:
- a first soft magnetic pole piece is disposed within said main module, protruding from a side thereof;
- a second soft magnetic pole piece is disposed within said auxiliary module, protruding from a side thereof, with said second soft magnetic pole piece being adjacent to and aligned with said first magnetic pole piece, when said car door is in a properly closed position;
- a permanent magnet is disposed on said second soft magnetic pole piece within said auxiliary module;
- a magnetically activated, normally closed, switch is disposed on said first pole piece within said main module;
- at least one battery is disposed within said main module;
- a buzzer and more than one electrically powered light sources, powered by said battery through said magnetically activated switch, are disposed within said main module;
- said light sources being adjacent to at least one light transmitting aperture formed on the housing of said main module; whereby, when said car door is properly closed, said permanent magnet in said auxiliary module induces a magnetic field in said first soft magnetic pole piece in said main module, causing said magnetically activated switch to open, with said buzzer and said light sources in an inactive state;
- when said car door is improperly closed, being ajar, said first soft magnetic pole piece is disaligned with said second soft magnetic pole piece, with the cessation of the magnetic field in said first soft magnetic pole piece, said magnetically activated switch returns to a closed state activating said buzzer and said light sources, providing a visible and audible warning to a user.

2. A car door closure warning system according to claim 1, wherein the outer housing of said main module and said auxiliary module are made from a resilient, impact resistant material;
- whereby, said auxiliary module, mounted on said car door, can provide protection to the edge of said car door against impact damage.

3. A car door closure warning system according to claim 2, wherein said main module and said auxiliary module are mounted to respective said car door and said car body by means of an adhesive layer attached to the rear surfaces of respective said main module and said auxiliary module;
- whereby, said main module can be manually removed and reattached to any part of the car body, being separated from said auxiliary module said main module automatically and continuously activates said buzzer and said light sources, acting as a nocturnal signal light and siren in emergency situations;
- when a car is driven past an object in close proximity to said door, upon the occurence of a glancing collision said auxiliary module and said main module would shear off under the impact, with the concomitant sound alerting the driver to an imminent collision with the actual said car body, and with no damage incurred by the violent dislodging of said main module or said auxiliary module.

4. A car door closure warning system according to claim 3, wherein said main module and said auxiliary module are mounted to respective said car door and said car body by means of a permanent magnet attached to the rear surfaces of respective said main module and said auxiliary module, providing the same functions according to the above claim.

5. A car door closure warning system according to claim 1, wherein said light source comprises at least one set of light emitting diodes.

6. A car door closure warning system according to claim 5, wherein:
- said light source comprises a first and second sets of light emitting diodes;
- said first and second sets of light emitting diodes are controlled by an electronic controlling means,
- said controlling means includes a pair of switching transistors, with each said switching transistor being controlled by a respective resistor and capacitor pair, both said pairs of resistors and capacitors having an equal time constant;

whereby, when activiated said electronic controlling means causes said first and second sets of light emitting diodes to emit light intermittently in a see-saw fashion, with said first set of light emitting diodes emitting light while said second set of light emitting diodes remain inactive, and vice-versa, said first and second sets of light emitting diodes having active states of equal duration and of a pre-determined time period.

* * * * *